(12) United States Patent
Choo

(10) Patent No.: US 7,423,703 B2
(45) Date of Patent: Sep. 9, 2008

(54) CASSETTE FOR LIQUID CRYSTAL PANEL INSPECTION AND METHOD OF INSPECTING LIQUID CRYSTAL PANEL

(75) Inventor: Hun Jun Choo, Kimi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/004,095

(22) Filed: Dec. 6, 2004

(65) Prior Publication Data

US 2005/0094055 A1 May 5, 2005

Related U.S. Application Data

(62) Division of application No. 10/316,894, filed on Dec. 12, 2002, now abandoned.

(30) Foreign Application Priority Data

Mar. 25, 2002 (KR) ............................. 2002-15963

(51) Int. Cl.
*G02F 1/1333* (2006.01)
(52) U.S. Cl. ........................... 349/58; 349/189; 430/30
(58) Field of Classification Search ................ 349/189, 349/58; 438/30
See application file for complete search history.

(56) References Cited

U.S. PATENT DOCUMENTS

| 3,978,580 A | 9/1976 | Leupp et al. |
|---|---|---|
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,677,749 A * | 10/1997 | Tsubota et al. .............. 349/160 |
| 5,680,189 A | 10/1997 | Shimizu et al. |
| 5,699,138 A * | 12/1997 | Watanabe et al. ........... 349/189 |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |

(Continued)

FOREIGN PATENT DOCUMENTS

EP          1 003 066 A1     5/2000

(Continued)

*Primary Examiner*—Julie-Huyen Ngo
(74) *Attorney, Agent, or Firm*—McKenna Long & Aldridge LLP

(57) ABSTRACT

A cassette facilitates the inspection of liquid crystal panels and prevents breakage of the liquid crystal panels. The cassette includes a frame, plates arranged substantially parallel at top and bottom portions of the frame, and slots secured to the plates so as to secure the liquid crystal panels arranged within the cassette.

3 Claims, 9 Drawing Sheets

U.S. PATENT DOCUMENTS

| | | | |
|---|---|---|---|
| 5,861,932 A | 1/1999 | Inata et al. | |
| 5,875,922 A | 3/1999 | Chastine et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,186,344 B1 | 2/2001 | Park et al. | |
| 6,190,224 B1 | 2/2001 | Byun et al. | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,391,137 B1 | 5/2002 | Matsushima | |
| 6,398,610 B1 | 6/2002 | Inoue | |
| 6,414,733 B1 | 7/2002 | Ishikawa et al. | |
| 2001/0002100 A1 | 5/2001 | Compton et al. | |
| 2002/0001866 A1* | 1/2002 | Kido et al. | 438/30 |
| 2002/0012094 A1* | 1/2002 | Suzuki | 349/153 |
| 2005/0018126 A1* | 1/2005 | Choi et al. | 349/189 |

FOREIGN PATENT DOCUMENTS

| | | |
|---|---|---|
| EP | 1003066 | 5/2000 |
| JP | 51065656 | 6/1976 |
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 6235925 | 8/1994 |
| JP | 06265915 | 9/1994 |
| JP | 6313870 | 11/1994 |
| JP | 7084268 | 3/1995 |
| JP | 07128674 | 5/1995 |
| JP | 07181507 | 7/1995 |
| JP | 08095066 | 4/1996 |
| JP | 8101395 | 4/1996 |
| JP | 08106101 | 4/1996 |
| JP | 08171094 | 7/1996 |
| JP | 08190099 | 7/1996 |
| JP | 08240807 | 9/1996 |
| JP | 08-259193 | 10/1996 |
| JP | 09005762 | 1/1997 |
| JP | 09026578 | 1/1997 |
| JP | 9061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10177178 | 6/1998 |
| JP | 10221700 | 8/1998 |
| JP | 10282512 | 10/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11248930 | 9/1999 |
| JP | 11326922 | 11/1999 |
| JP | 11344714 | 12/1999 |
| JP | 2000002879 | 1/2000 |
| JP | 2000029035 | 1/2000 |
| JP | 20000056311 | 2/2000 |
| JP | 20000066165 | 3/2000 |
| JP | 2000137235 | 5/2000 |
| JP | 2000-206895 | 7/2000 |
| JP | 2000193988 | 7/2000 |
| JP | 2000241824 | 9/2000 |
| JP | 2000284295 | 10/2000 |
| JP | 2000292799 | 10/2000 |
| JP | 2000310759 | 11/2000 |
| JP | 2000310784 | 11/2000 |
| JP | 2000338501 | 12/2000 |
| JP | 2001005401 | 1/2001 |
| JP | 2001005405 | 1/2001 |
| JP | 2001013506 | 1/2001 |
| JP | 2001033793 | 2/2001 |
| JP | 2001042341 | 2/2001 |
| JP | 2001051284 | 2/2001 |
| JP | 2001066615 | 3/2001 |
| JP | 2001091727 | 4/2001 |
| JP | 2001117105 | 4/2001 |
| JP | 2001117109 | 4/2001 |
| JP | 2001133745 | 5/2001 |
| JP | 2001133794 | 5/2001 |
| JP | 2001133799 | 5/2001 |
| JP | 2001142074 | 5/2001 |
| JP | 2001147437 | 5/2001 |
| JP | 2001154211 | 6/2001 |
| JP | 2001166272 | 6/2001 |
| JP | 2001166310 | 6/2001 |
| JP | 2001183683 | 7/2001 |
| JP | 2001209052 | 8/2001 |
| JP | 2001209060 | 8/2001 |
| JP | 2001222017 | 8/2001 |
| JP | 2001235758 | 8/2001 |
| JP | 2001-244323 | 9/2001 |
| JP | 2001021000 | 9/2001 |
| JP | 2001255542 | 9/2001 |
| JP | 2001264782 | 9/2001 |
| JP | 2001026347 | 10/2001 |
| JP | 2001026348 | 10/2001 |
| JP | 2001272640 | 10/2001 |
| JP | 2001281675 | 10/2001 |
| JP | 2001282126 | 10/2001 |
| JP | 2001305563 | 10/2001 |
| JP | 2001330837 | 11/2001 |
| JP | 2001330840 | 11/2001 |

| | | | | | | |
|---|---|---|---|---|---|---|
| JP | 2001356353 | 12/2001 | | JP | 2002122872 | 4/2002 |
| JP | 2001356354 | 12/2001 | | JP | 2002122873 | 4/2002 |
| JP | 2002014360 | 1/2002 | | JP | 2002080321 | 6/2002 |
| JP | 2002023176 | 1/2002 | | JP | 2002202512 | 7/2002 |
| JP | 2002049045 | 2/2002 | | JP | 2002202514 | 7/2002 |
| JP | 2002082340 | 3/2002 | | JP | 2002214626 | 7/2002 |
| JP | 2002090759 | 3/2002 | | KP | 20000035302 | 6/2000 |
| JP | 2002090760 | 3/2002 | | | | |
| JP | 2002107740 | 4/2002 | | | | |

* cited by examiner

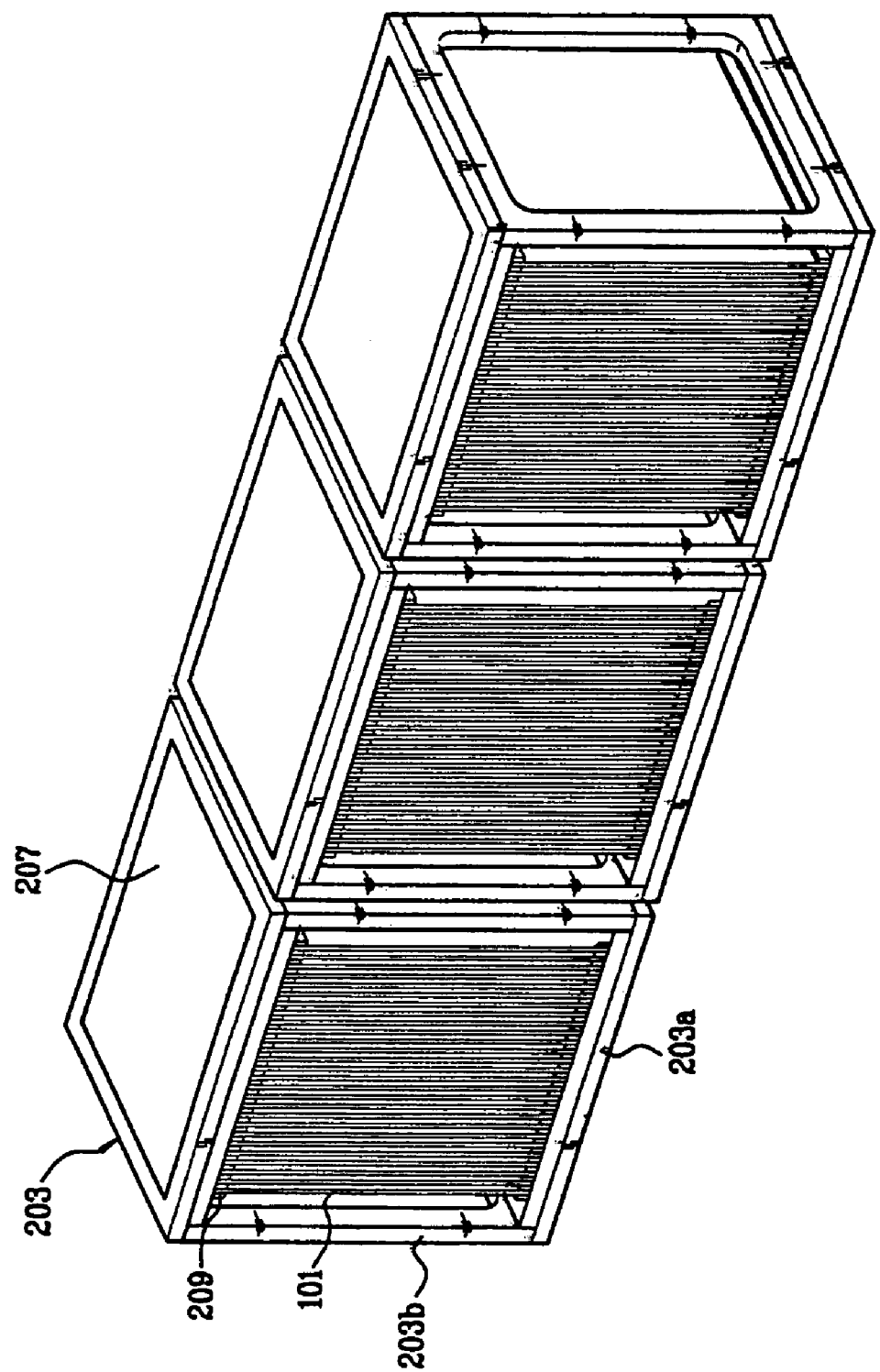

CASSETTE FOR LIQUID CRYSTAL PANEL INSPECTION AND METHOD OF INSPECTING LIQUID CRYSTAL PANEL

CROSS-REFERENCE TO RELATED APPLICATIONS

This application is a divisional application of U.S. patent application Ser. No.: 10/316,894 filed Dec. 12, 2002, now abandoned, which claims priority to Korean Patent Application No.: 2002-15963, filed Mar. 25, 2002, each of which is incorporated by reference for all purposes as if fully set forth herein.

This application claims the benefit of the Korean Application No. P2002-15963 filed on Mar. 25, 2002, which is hereby incorporated by reference for all purposes as if fully set forth herein.

BACKGROUND OF THE INVENTION

1. Field of the Invention

The present invention relates to a cassette containing at least one liquid crystal panel, and more particularly, to a cassette facilitating the inspection of at least one liquid crystal panel and a method of inspecting at least one liquid crystal panel.

2. Discussion of the Related Art

Generally, recent developments in technology have increased the demand for various types of display devices. In response to this increased demand, numerous types of flat panel displays (e.g., liquid crystal displays (LCDs), plasma display panels (PDPs), electro-luminescent displays (ELDs), vacuum fluorescent displays (VFDs), FED(field emission display), etc.) have been developed.

Owing to their large contrast ratio, low power consumption, and their ability to display gray levels and moving pictures, LCDs are ideal in for use in notebook personal computers, desk-top monitors, and televisions, and the like.

LCDs are fabricated using a series of fabricating processes including a substrate fabricating process, a liquid crystal panel fabricating process, and a module fabricating process.

The substrate fabricating process includes steps of forming an array of thin film transistors (TFTs) and pixel electrodes on a first substrate (i.e., a TFT substrate) and forming a black matrix, a color filter layer, etc., on a second substrate (i.e., a color filter substrate).

The liquid crystal panel fabricating process includes a step of bonding the TFT substrate and the color filter substrate together such that they are spaced apart at a uniform distance by a cell gap. The liquid crystal panel fabricating process further includes a step of injecting liquid crystal material into the cell gap.

The module fabricating process generally includes steps required to fabricate an operational LCD module after a signal processing circuit is fabricated.

A typical liquid crystal panel fabricating process will now be described in greater detail.

A first cassette (not shown), housing a first plurality of TFT substrates, and a second cassette (not shown), housing a second plurality of color filter substrates, are mounted into respective ports via loaders.

A plurality of gate lines are formed at fixed intervals along a first direction and a plurality of data lines are formed along a second direction, perpendicular to the first direction, on the TFT substrate. Accordingly, a plurality of pixel regions may be formed in a matrix pattern at the crossing of each of the gate and data lines. A plurality of pixel electrodes and a plurality of thin film transistors (TFTs) are formed at the pixel regions. A black matrix layer, color filters, and a common electrode are sequentially formed on the color filter substrate.

Next, each of the TFT and color filter substrates are unloaded from the first and second cassettes, respectively, using a robot arm programmed to select each of the TFT and color filter substrates one at a time.

Referring to FIG. 1, after an alignment material has been coated on the unloaded TFT and color filter substrates, an alignment process (1S) is performed on the coated alignment material to uniformly align liquid crystal material that is to be injected into the cell gap.

After the alignment process is completed, the TFT and color filter substrates are cleaned (2S), spacers are dispensed on the TFT substrate so as to ensure that the cell gap is uniform (3S), sealant is coated on an edge of the color filter substrate such that a liquid crystal injection inlet is formed (4S), and the TFT and color filter substrates are then bonded to each other (5S).

The bonded TFT and color filter substrates are then cut and processed into a liquid crystal panel (6S).

Subsequently, liquid crystal material is injected through the liquid crystal injection inlet into the cell gap of each of the liquid crystal panels and the liquid crystal injection inlet is then sealed (7S).

Lastly, the liquid crystal panel is inspected to determine the presence of any electrical failures and to evaluate the thermal stability of the injected liquid crystal material (8S).

The electrical failure inspection is performed by performing a lighting test on each of the liquid crystal panels using an A/P station. Inspection to evaluate the thermal stability of the injected liquid crystal material is performed by storing a plurality of liquid crystal panels in a substantially vertical position for a predetermined amount time at a constant, elevated temperature, (e.g., greater than room temperature).

A cassette, facilitating the transport and storage of a plurality liquid crystal panels, is therefore required in inspecting a plurality of the liquid crystal panels. The cassette is not only used in transporting, storing, and inspecting the plurality of liquid crystal panels, but is also used during the substrate, liquid crystal panel, and module fabricating processes.

FIG. 2 illustrates a perspective view of a cassette used in inspecting liquid crystal panels.

Referring to FIG. 2, a cassette used in inspecting liquid crystal panels includes a pair of side plates 17 having slots for supporting opposing edges of a plurality of liquid crystal panels 11, a frame 13 for supporting the side plates 17, and bars 15 for adjusting a distance between the side plates 17 in accordance with sizes of various the liquid crystal panels 11.

Slots 19 are arranged vertically along the side plates 17 for supporting the liquid crystal panels 11 arranged within the cassette. Dimensions of the slots 19 are maintained such that the area of the liquid crystal panels 11 contacting the slots 19 is minimized.

When the liquid crystal panels 11 are inserted into the cassette 30 as illustrated in FIG. 2, however, the productivity of an inspection of liquid crystal material for thermal stability and failure is minimized, as will be described in greater detail below.

FIG. 3 illustrates a diagram of a liquid crystal panel inspecting method and FIG. 4 illustrates a perspective view of a problem encountered during inspection when using cassettes such as those illustrated in FIG. 2.

Referring to FIG. 3, a plurality of liquid crystal panels 11 containing liquid crystal material that are to be inspected for thermal stability, are oriented substantially vertically within a cassette 30. The cassette 30 is then loaded into an oven 10 via a manually guided vehicle (MGV) 20.

After being heated for a predetermined amount of time, the cassette 30 is unloaded from the oven 10. Upon inspection, the thermal stability of the liquid crystal material within each of the liquid crystal panels 11 is evaluated. If it is determined that bubbles are present at an upper portion of the liquid crystal panels 11, the thermal stability of the liquid crystal material is determined to be insufficient and the liquid crystal panel is considered a failure. When the liquid crystal panels 11 are arranged within the cassette 30 in substantially vertical orientation, performing the thermal stability inspection may be facilitated as bubbles are generally easier to detect in liquid crystal panels oriented substantially vertically compared to liquid crystal panels oriented substantially horizontally.

The horizontal lengths of both the cassette 30 and the oven opening 10a illustrated in FIGS. 2 and 3, respectively, are greater than their respective vertical lengths. Accordingly, and referring to FIG. 4, liquid crystal panels 11 must be loaded vertically into cassettes such as those illustrated in FIG. 2 when the cassette 30 is loaded into the oven 10.

The liquid crystal panel arrangement illustrated in FIG. 4, however, is disadvantageous for the following reasons.

First, when the plurality of the liquid crystal panels 11 are inserted into the cassette 30 illustrated in FIG. 4, the liquid crystal panels 11 have a tendency to contact both side plates 17 and associated slots 19. Accordingly, the liquid crystal panels 11 provided in the arrangement described above may be scratched or broken when the cassette is loaded and unloaded into and out of the oven 10.

Second, when the plurality of liquid crystal panels 11 are inserted into the cassette 30, as illustrated in FIG. 4, they are generally inclined and thus remove space within the cassette 30 that would otherwise be available for other liquid crystal panels 11. Accordingly, space within the cassette is inefficiently managed.

SUMMARY OF THE INVENTION

Accordingly, the present invention is directed to a cassette facilitating the inspection of liquid crystal panels and a method of inspecting liquid crystal panels that substantially obviates one or more problems due to limitations and disadvantages of the related art.

An advantage of the present invention provides a cassette used in inspecting liquid crystal panels and a method of inspecting liquid crystal panels.

In one aspect of the present invention, liquid crystal panels to be inspected may be arranged within the cassette while minimizing the risk of being broken.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a cassette facilitating the inspection of liquid crystal panels may include a frame, substantially parallel plates arranged at top and bottom portions of the frame, and slots coupled to the plates so as to secure liquid crystal panels arranged within the cassette.

In one aspect of the present invention, the frame may have a horizontal length greater than a vertical length.

In another aspect of the present invention, the frame may have a horizontal length less than a vertical length.

In yet another aspect of the present invention, the frame have a horizontal length substantially equal to a vertical length.

In still another aspect of the present invention, a width of the slots corresponds with a thickness of liquid crystal panels.

Further, in another aspect of the present invention, the slots may be formed such that they contact at least a portion of the edges of each of the liquid crystal panels.

In yet another aspect of the present invention, a method of inspecting liquid crystal panels may include the steps of inserting a plurality of liquid crystal panels into a substantially vertically oriented cassette, wherein the plurality of liquid crystal panels are arranged such that they are substantially parallel to each other, arranging the cassette such that the liquid crystal panels are substantially vertically oriented, loading the cassette into an oven, and maintaining the oven at a constant temperature (e.g., about 60~120° C.).

In still another aspect of the present invention, the method may further include the steps of unloading the cassette from the oven and inspecting each of the liquid crystal panels while they are oriented substantially vertically to evaluate the thermal stability of the liquid crystal material.

In a further aspect of the present invention, at least one cassette may be loaded into the oven.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 6 and 7 illustrates views of a cassette facilitating the inspection of liquid crystal panels according to embodiments of the present invention.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 7:
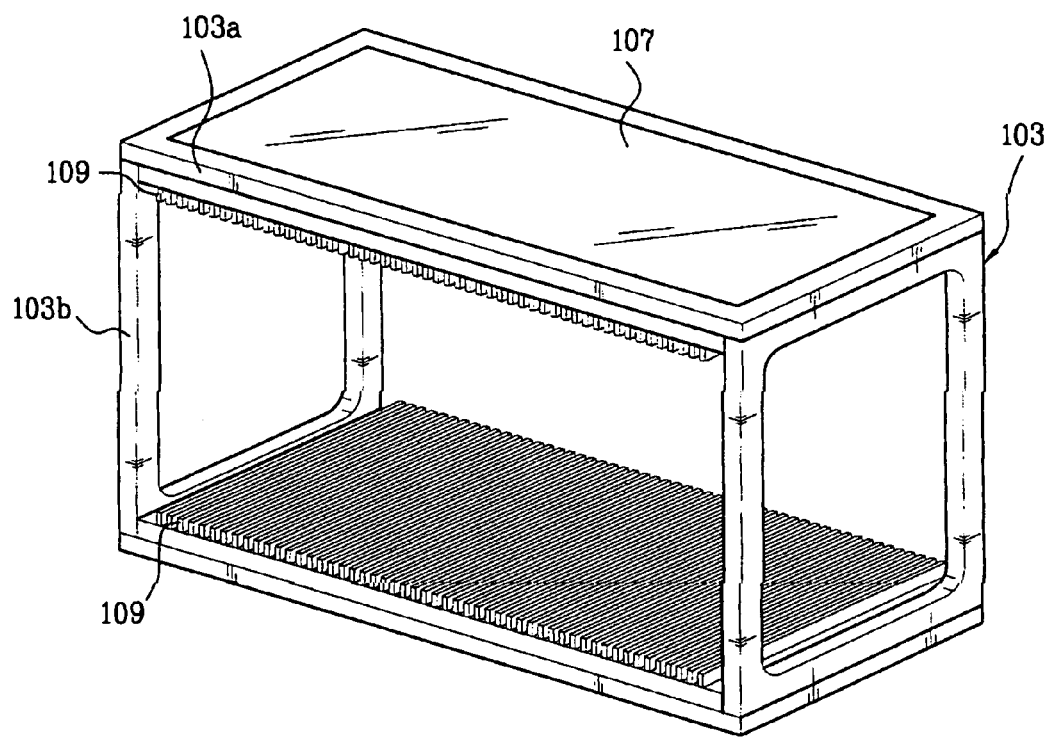

FIG. 7 illustrates a perspective view of a cassette facilitating the inspection of liquid crystal panels according to an embodiment of the present invention.

Referring to FIG. 7, a cassette facilitating the inspection of liquid crystal panels may, for example, include a frame 103 for holding a plurality of liquid crystal panels 101, plates 107 arranged substantially parallel to each other at top and bottom portions of the frame 103, and slots 109 coupled to the plates for securing at least one liquid crystal panel 101 arranged within the cassette in a substantially vertical orientation.

The frame 103 may be characterized as having a horizontal length 103a longer than a vertical length 103b.

In one aspect of the present invention, slots 109 may be formed such an area of the slots 109 contacting the at least one liquid crystal panel 101 is minimized.

A method of inspecting liquid crystals using the aforementioned cassette will now be explained in detail.

Figure 5A:
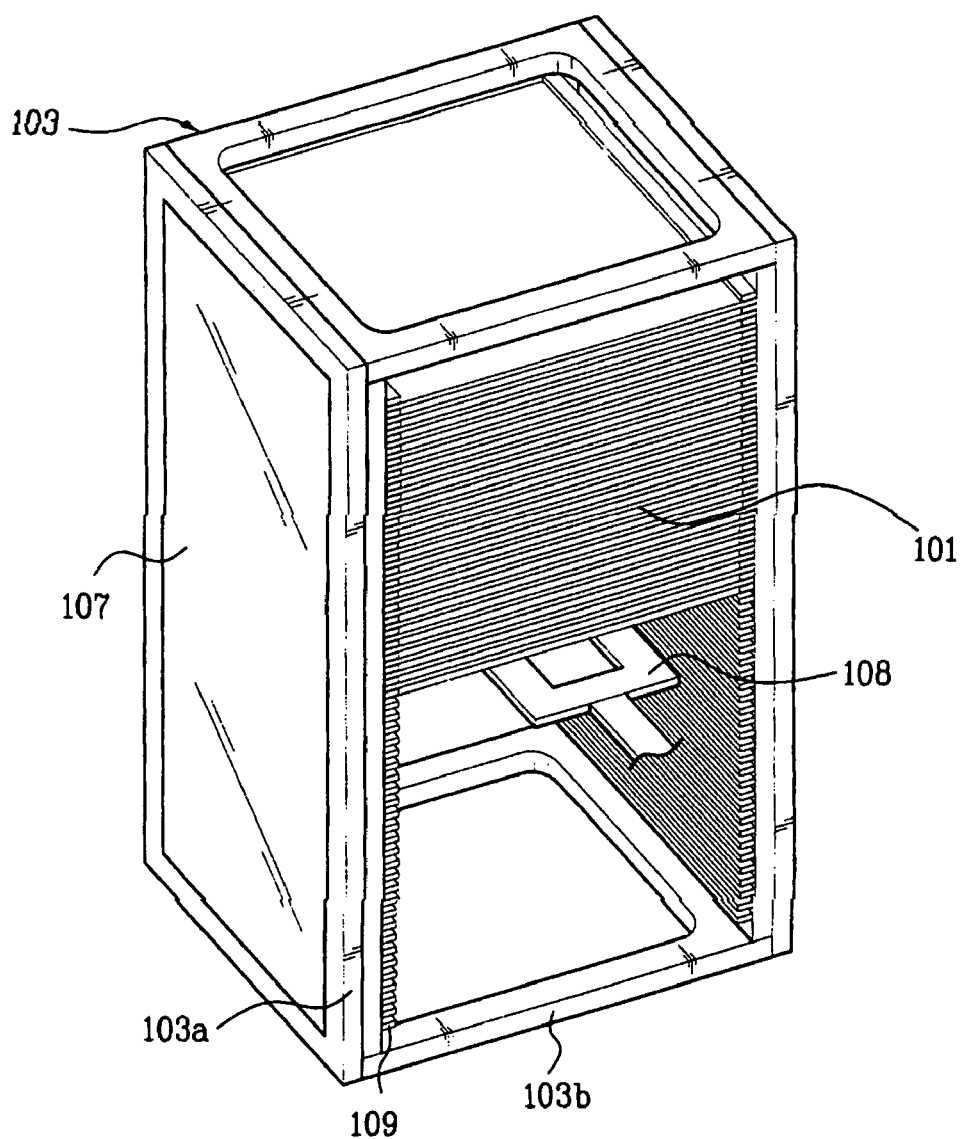
FIGS. 5A-5C illustrates the various orientations of the liquid crystal panels with respect to the frame for holding the plurality of liquid crystal panels.

Before insertion of the plurality of liquid crystal panels 101, as shown in FIG. 5A, the cassette may, for example, be substantially vertically oriented so that the horizontal length 103a of the frame 103 is vertically arranged and plates 107 may be arranged at right and left sides of the frame 103. And then a plurality of the liquid crystal panels 101 may be inserted into the cassette such that they are substantially parallel with each other and substantially horizontally oriented. The liquid crystal panels 101 may be arranged within the slots 109.

Figure 5B:
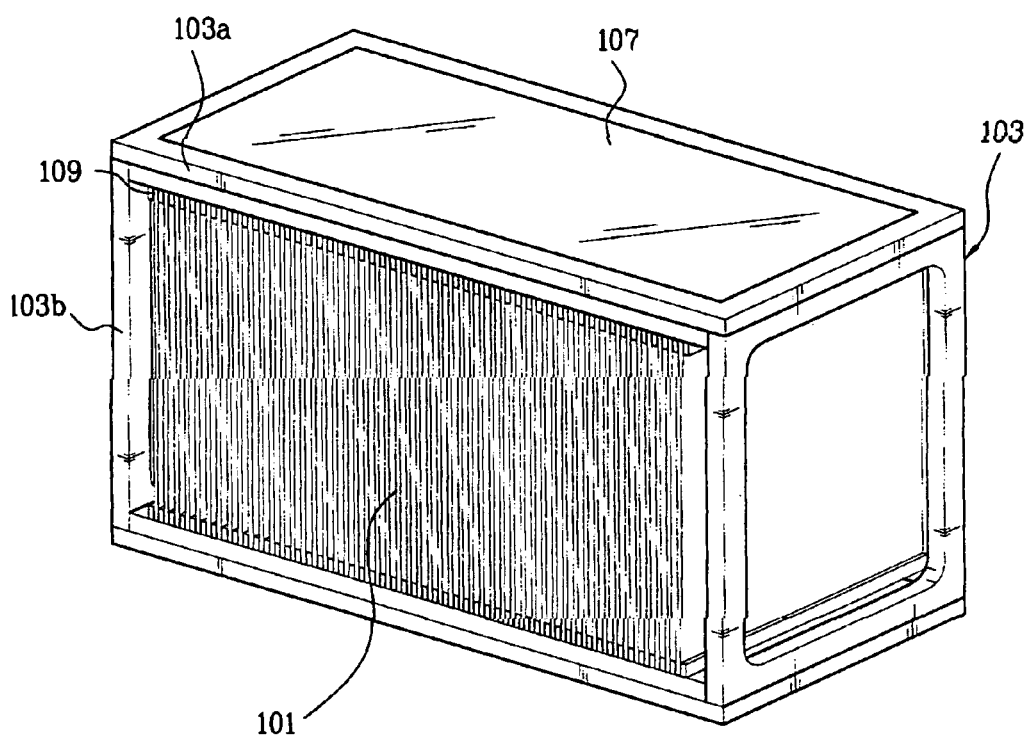
Figure 5C:
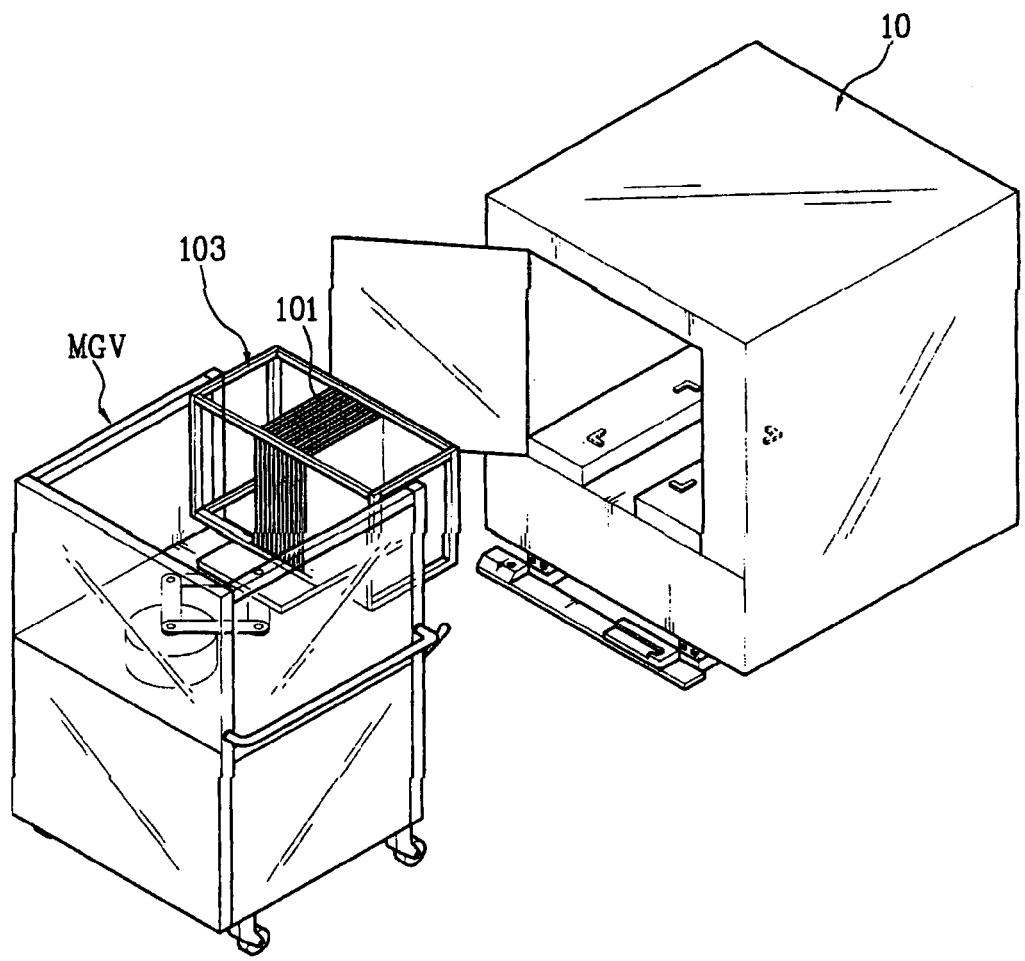

As shown in FIG. 5B, the cassette, having a plurality of liquid crystal panels arranged therein, may then be oriented so that the horizontal length 103a of the frame 103 is horizontally arranged. As shown in FIG. 5C, the cassette is loaded into an oven 10 using an MGV (manually guided vehicle). In one aspect of the present invention, the plurality of liquid crystal panels 101 may be inserted into the oven 10 such that they are oriented substantially vertically.

When the liquid crystal panels 101 are inserted into the cassette, slots 109 may support at least a portion of the edges of the liquid crystal panels 101. Moreover, the width of each of the slots 109 may correspond with a thickness of each of the liquid crystal panels. In one aspect of the present invention, each of the liquid crystal panels 101 in their respective slots 109 may be separated from each other.

After being heated for a predetermined amount of time at a constant temperature (e.g., about 60~120° C.), the cassette may be removed from the oven 10. Upon performing an inspection, the thermal stability of the liquid crystal material within each of the liquid crystal panels 101 may evaluated. If it is determined that bubbles are found at an upper portion of any of the liquid crystal panels 101 inserted into the cassette, the liquid crystal panel 101 is determined to be a failure.

According to the principles of the present invention, the cassette facilitates the vertical insertion and inspection of liquid crystal panels heated in an oven.

FIG. 6 illustrates a perspective view of a cassette facilitating the inspection of liquid crystal panels according to another embodiment of the present invention.

Referring to FIG. 6, a cassette facilitating the inspection of liquid crystal panels may, for example, include a frame 203 for holding a plurality of liquid crystal panels 101, plates 207 arranged substantially parallel to each other at top and bottom portions of the frame 203, and slots 209 coupled to the plates 207 for securing at least one liquid crystal panel 101 arranged within the cassette in a substantially vertical orientation.

The frame 203 may be characterized as having a horizontal length 203a less than, or substantially equal to, a vertical length 203b.

Figure 1:
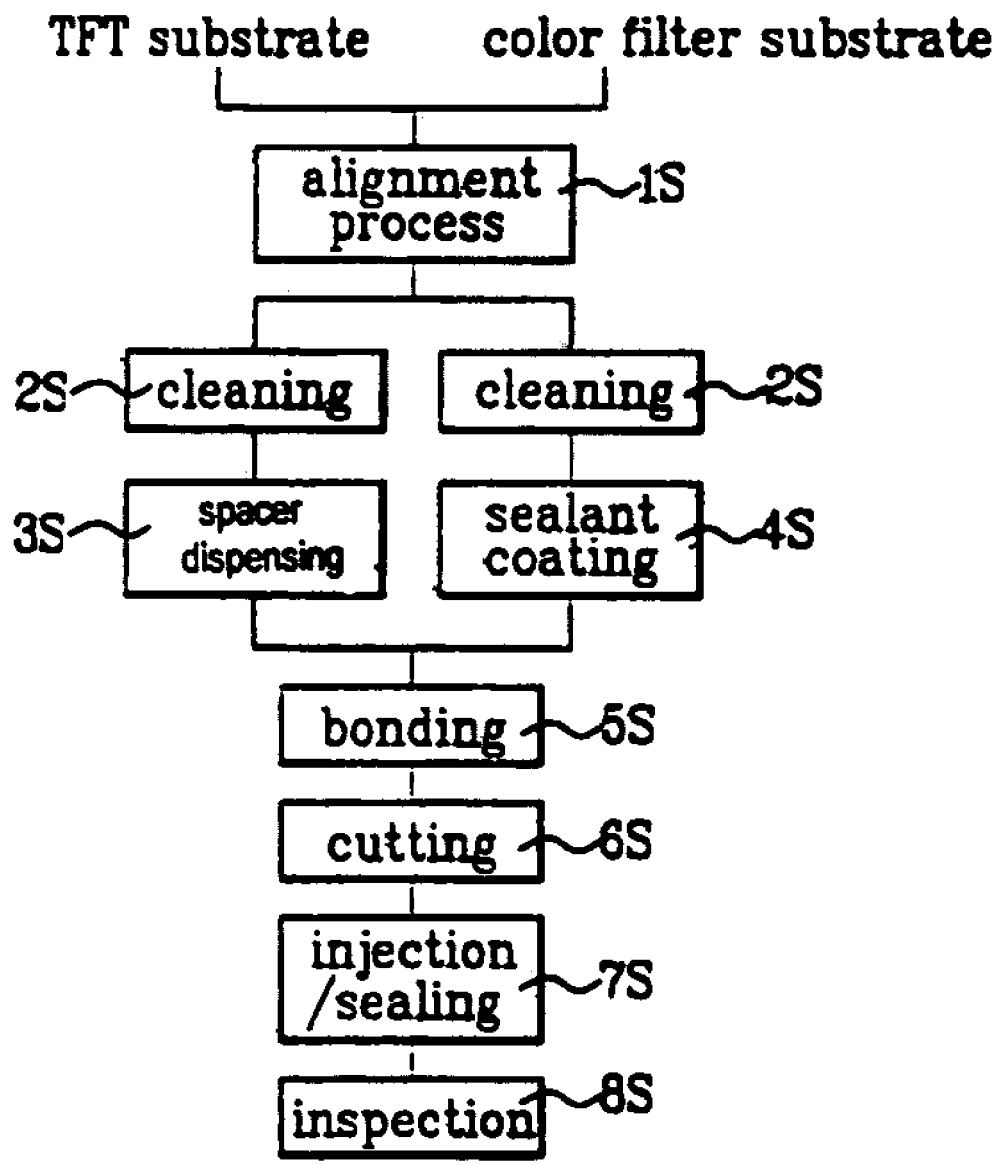
FIG. 1 illustrates a flowchart of a liquid crystal panel fabricating method.
Figure 2:
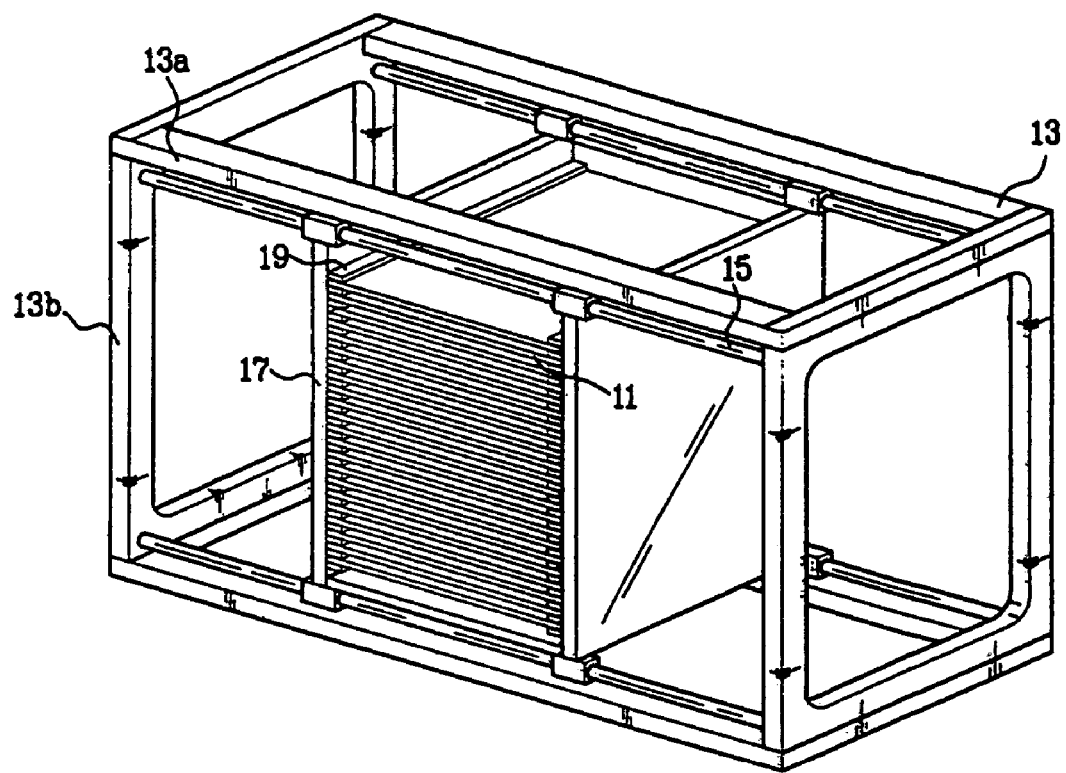
FIG. 2 illustrates a perspective view of a cassette used in inspecting liquid crystal panels.
Figure 3:
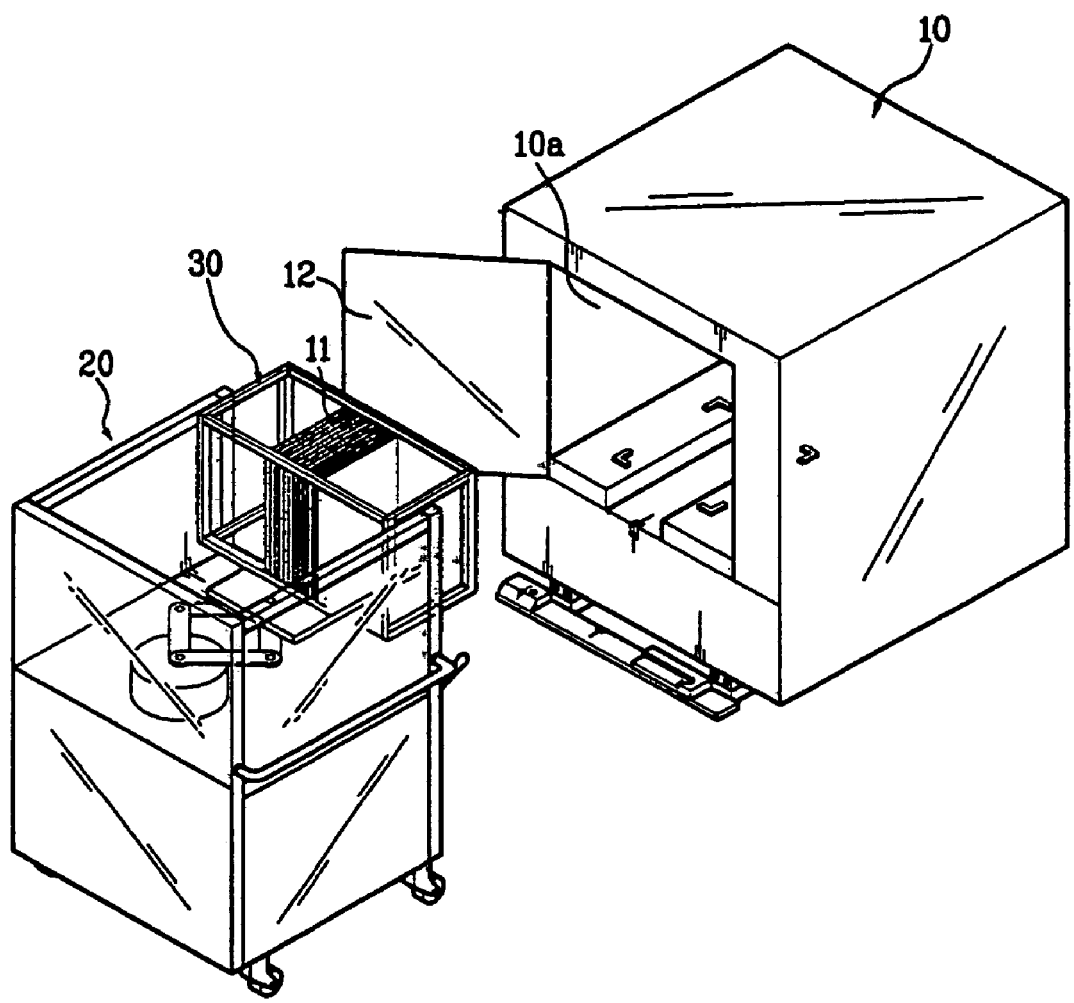
FIG. 3 illustrates a diagram of a liquid crystal panel inspecting method.
Figure 4:
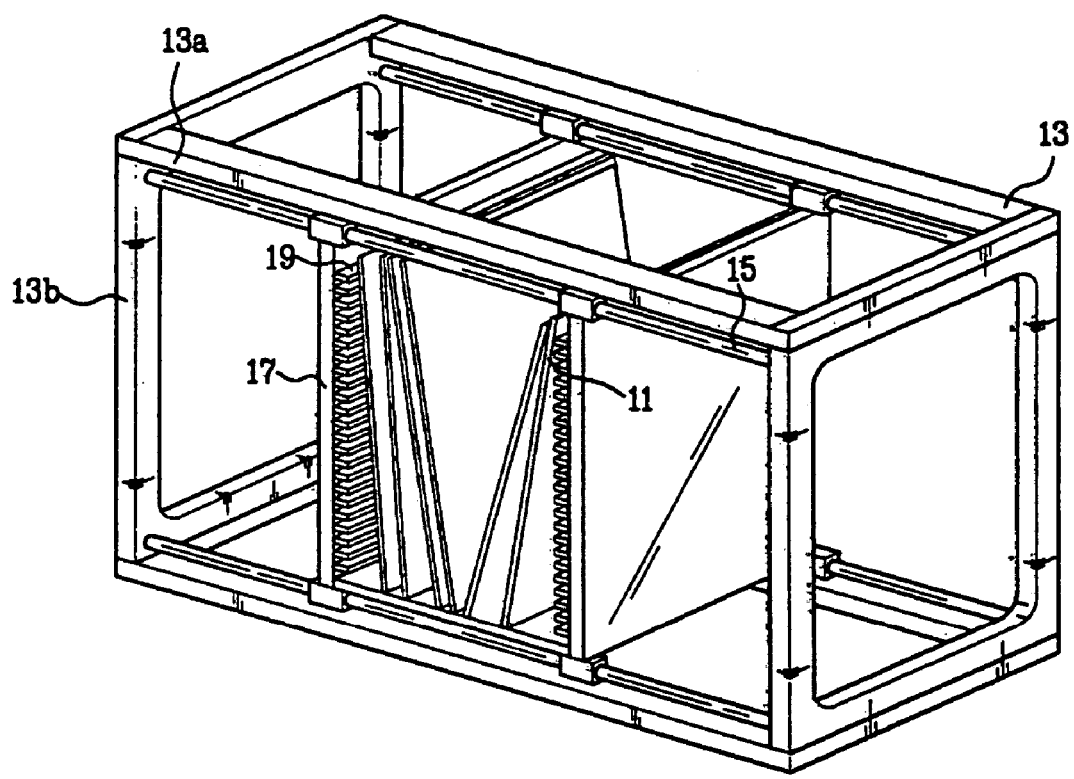
FIG. 4 illustrates a perspective view of a problem encountered during inspection when using cassettes such as those illustrated in FIG. 2.

In one aspect of the present invention, the cassette may be smaller in size than cassettes such as those illustrated in FIG. 2. The smaller size facilitates the transport and orientation of cassettes having liquid crystal panels arranged therein. Additionally, the cassette of the present embodiment may be loaded and unloaded into and out from an oven.

As similarly described with respect to the embodiment mentioned above, liquid crystal panels 101 may be horizontally arranged within the cassette illustrated in FIG. 6, when the cassette is oriented substantially vertically. Once loaded with at least one liquid crystal panel 101, the cassette may be loaded and unloaded into and out from the oven. In one aspect of the present invention, the cassette may be oriented substantially horizontally within the oven and during inspection such that the liquid crystal panels are oriented substantially vertically.

According to the principles of the present invention, the cassette may facilitate the inspection and transport of liquid crystal panels.

According to the principles of the present invention, at least one liquid crystal panel may be arranged within the cassette. Further, the at least one liquid crystal panel may be prevented from breaking even when the cassette of the present invention is transported.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of inspecting liquid crystal panels, comprising:
    preparing a cassette including a frame having a horizontal length longer than a vertical length;
    arranging the cassette so that the horizontal length of the frame is vertically oriented, and then inserting at least one liquid crystal panel into the cassette, horizontally;
    arranging the cassette such that the at least one liquid crystal panel inserted within the cassette is oriented substantially vertically;
    loading the cassette in which the at least one liquid crystal panel is vertically oriented into an oven; and
    heating the loaded cassette in the oven at a constant temperature.

2. The method of claim 1, wherein the constant temperature is about 60~120° C.

3. The method of claim 1, wherein at least one cassette is loaded into the oven.

* * * * *